(12) United States Patent
Smith et al.

(10) Patent No.: US 8,339,898 B2
(45) Date of Patent: Dec. 25, 2012

(54) PROCESSING SEISMIC DATA USING COMBINED REGULARIZATION AND 4D BINNING

(75) Inventors: Patrick J. Smith, Stavanger (NO); Anthony D. Curtis, Lamberhurst (GB)

(73) Assignee: WesternGeco L.L.C., Houston, TX (US)

( * ) Notice: Subject to any disclaimer, the term of this patent is extended or adjusted under 35 U.S.C. 154(b) by 1249 days.

(21) Appl. No.: 12/126,892

(22) Filed: May 25, 2008

(65) Prior Publication Data
US 2009/0290449 A1   Nov. 26, 2009

(51) Int. Cl.
*G01V 1/00* (2006.01)
(52) U.S. Cl. ............................................. 367/38; 702/14
(58) Field of Classification Search ................... 367/22, 367/25, 43, 45, 74, 76; 702/14, 189, 190, 702/194
See application file for complete search history.

(56) References Cited

U.S. PATENT DOCUMENTS

| | | | | |
|---|---|---|---|---|
| 5,504,678 | A * | 4/1996 | Juszczak et al. | 702/14 |
| 5,594,706 | A * | 1/1997 | Shenoy et al. | 367/76 |
| 5,642,327 | A * | 6/1997 | Schiflett et al. | 367/47 |
| 5,956,666 | A * | 9/1999 | Mou | 702/190 |
| 6,026,059 | A | 2/2000 | Starr | |
| 6,178,381 | B1 | 1/2001 | Padhi et al. | |
| 2005/0065758 | A1 | 3/2005 | Moore | |
| 2005/0143923 | A1 * | 6/2005 | Keers et al. | 702/14 |
| 2006/0224363 | A1 * | 10/2006 | Valadez | 702/189 |

FOREIGN PATENT DOCUMENTS
WO     WO2004046758 A1     6/2004

OTHER PUBLICATIONS

PCT Search Report, dated Jan. 4, 2010, Application No. PCT/US2009/045060.
Calvert, Insights and Methods for 4D Reservoir Monitoring and Characterization, SEG/EAGE Distinguished Instructor Short Course, 2005, pp. 51-83.
Canning, et al, Reducing 3-D acquisition footprint for 3-D DMO and 3-D Prestack Migration, Geophyics, 1998, pp. 1177-1183, vol. 63, No. 4.
H. Jaramillo, Practical Aspects of Voronoi-Based Area Weights for Kirchhoff Migration, 75th Ann. Internat. Mtg: Soc. of Expl. Geophys., 2005, 1886-1889, Houston.
H. Jaramillo, et al, Seismic Data Mapping, 68th Ann. Internat. Mtg: Soc. of Expl. Geophys, 1998.
Kragh et al, 2002 Seismic repeatability, normalized rms, and predictability, The Leading Edge, Jul. 2002, pp. 640-647.
Li, et al, Azimuth Preserved Trace Binning of 4D Seismic Data for Improved Repeatability, EAGE 65th Conference, 2003, Stavanger, NO.
Poole, et al, Effect of Regularization in the Migration of Time Lapse Data, First Break, Apr. 2006, pp. 25-31.
Widmaier et al, Azimuth preservation in Marine 4D Acquisition, 65th Conference and Exhibition, European Association of Geoscientists and Engineers, Expanded Abstract C04, Stavanger, NO.
Zwartjes et al, Fourier reconstruction of marine-streamer data in four spatial co-ordinates, Geophysics, 2006, pp. V171-V186, vol. 71, No. 6.

* cited by examiner

*Primary Examiner* — Isam Alsomiri
*Assistant Examiner* — Daniel L Murphy

(57) ABSTRACT

To process seismic data, a combined four-dimensional (4D) binning and regularization procedure is performed on the seismic data, where the combined 4D binning and regularization procedure includes computing measures associated with regularization of the seismic data, computing measures associated with 4D binning, and processing the seismic data according to the regularization measures and 4D binning measures.

19 Claims, 4 Drawing Sheets

PROCESSING SEISMIC DATA USING COMBINED REGULARIZATION AND 4D BINNING

TECHNICAL FIELD

The invention relates generally to processing seismic data that uses combined regularization and 4D binning.

BACKGROUND

Seismic surveying is used for identifying subterranean elements, such as hydrocarbon reservoirs, fresh water aquifers, gas injection reservoirs, and so forth. In performing seismic surveying, seismic sources and seismic sensors can be placed at various locations on an earth surface (e.g., a land surface or a sea floor), or even in a wellbore, with the seismic sources activated to generate seismic waves. Examples of seismic sources include explosives, air guns, acoustic vibrators, or other sources that generate seismic waves.

Some of the seismic waves generated by a seismic source travel into a subterranean structure, with a portion of the seismic waves reflected back to the surface (earth surface, sea floor, or wellbore surface) for receipt by seismic sensors (e.g., geophones, hydrophones, etc.). These seismic sensors produce signals that represent detected seismic waves. Signals from the seismic sensors are processed to yield information about the content and characteristics of the subterranean structure.

Often, time-lapse (four-dimensional or 4D) seismic surveying is performed, where the 4D seismic surveying involves acquiring multiple repeated surveys at different times. By using two or more seismic surveys acquired in time-lapse seismic surveying at different times, production-related or other development effects on a subterranean structure can be measured (e.g., effects as a result of production of hydrocarbons from a hydrocarbon reservoir). Each of the surveys conducted in the time-lapse seismic surveying will usually be irregularly sampled (acquired with irregular spatial sampling), and most likely, differently sampled.

As a result of the irregular and different sampling between surveys of the time-lapse seismic surveying, seismic processing algorithms employed on the repeated surveys of the time-lapse seismic surveying may produce differing results. Also, the image of the reservoir will differ for different surveys of the time-lapse surveying. The above effects may cause spurious differences between time-lapse surveys that may obscure the desired differences that are the objective of repeated measurements in 4D seismic surveying.

A further issue that affects time-lapse seismic surveying accuracy is overburden heterogeneity. "Overburden" refers to the geological area that overlies a target structure of interest (e.g., hydrocarbon reservoir) in the subsurface. Overburden heterogeneity refers to the fact that the overburden exhibits properties (e.g., velocity and density) that do not vary smoothly in the spatial and/or temporal sense. Instead, the overburden properties may vary rapidly, such as due to presence of rock fractures or harder and softer regions in the overburden.

A conventional solution for addressing overburden heterogeneity is to repeat source and receiver locations of each survey as accurately as possible to ensure that the pattern of seismic data distortion caused by the heterogeneity is the same in each survey. This can be accomplished by acquiring excess seismic data to increase the likelihood of well repeated trace pairs. This excess coverage provides an opportunity to select for subsequent processing, by 4D binning, the best repeated traces from a pair of time-lapse surveys.

Trace selection performed during 4D binning can adversely affect the quality of subsequent regularization performed to compensate for irregular data distribution in each seismic survey. Note that 4D binning and regularization are typically two independent operations performed separately, with regularization typically performed after 4D binning.

SUMMARY

In general, according to an embodiment, to improve accuracy of seismic data processing, 4D binning and regularization are combined such that 4D binning and regularization can be performed together.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
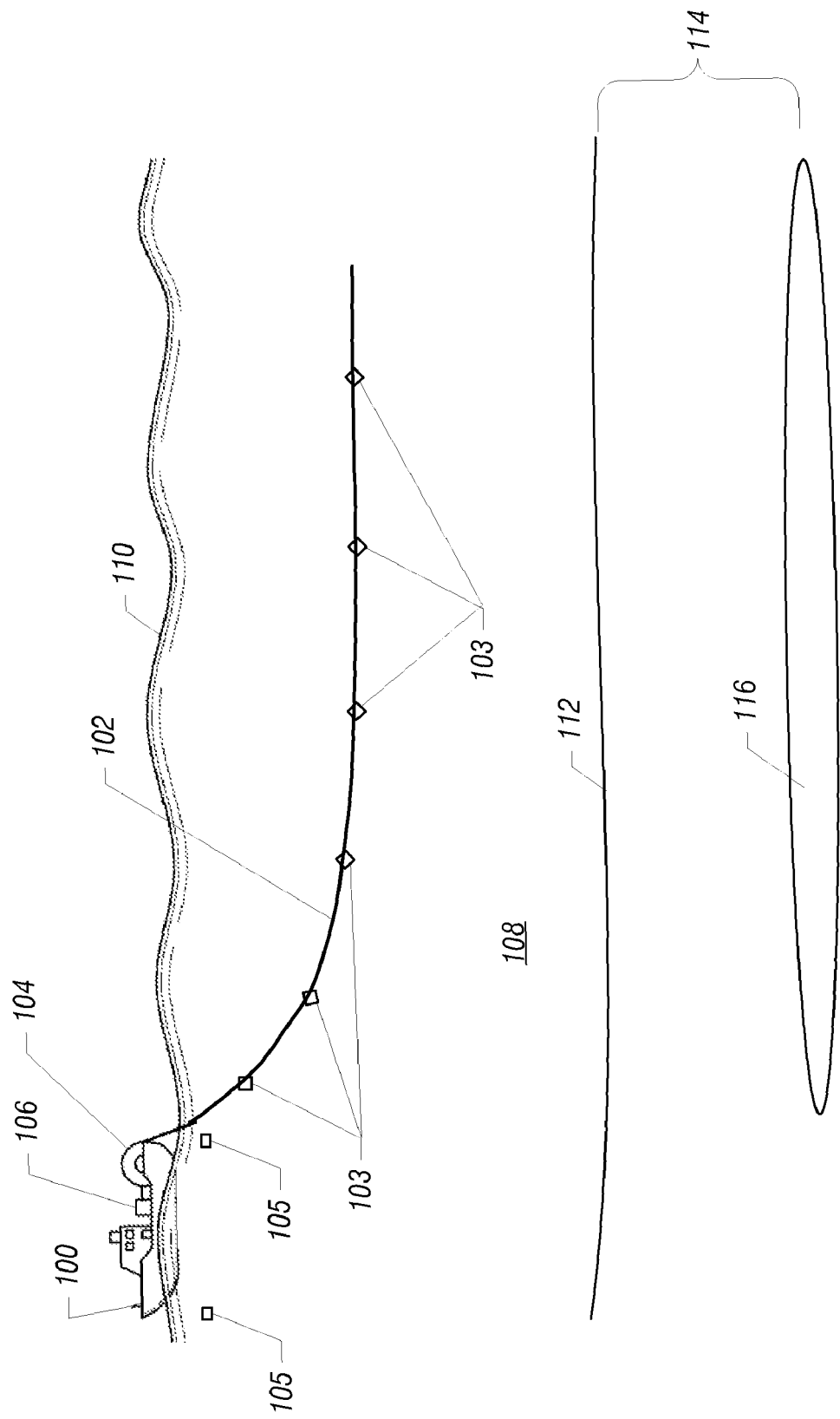
FIG. 1 illustrates an example arrangement for performing marine seismic surveying, in which seismic data processing according to an embodiment can be employed.

FIG. 1 illustrates an example arrangement to perform marine seismic surveying. However, other implementations can involve land-based seismic surveying or wellbore seismic surveying. FIG. 1 illustrates a sea vessel 100 that has a reel or spool 104 for deploying a streamer 102 (or multiple streamers 102), where the streamer 102 is a cable-like carrier structure that carries a number of electronic devices 103 for performing a subterranean survey of a subterranean structure 114 below a sea floor 112. In the following, the term "streamer" is intended to cover either a streamer that is towed by a sea vessel or a sea bed cable laid on the sea floor 112.

The electronic devices 103 can include sensing modules, steering or navigation devices, air gun controllers (or other signal source controllers), positioning devices, and so forth. Also depicted in FIG. 1 are a number of signal sources 105 that produce signals propagated into the body of water 108 and into the subterranean structure 114. Although the sources 105 are depicted as being separate from the streamer 102, the sources 105 can also be part of the streamer 102 in a different implementation.

The signals from the sources 105 are reflected from layers in the subterranean structure 114, including a body of interest 116 that can be any one of a hydrocarbon-containing reservoir, a fresh water aquifer, a gas injection zone, and so forth. Signals reflected from the body 116 are propagated upwardly toward the sensing modules of the streamer 102 for detection by the sensing modules. Measurement data is collected by the sensing modules, which can store the measurement data and/or transmit the measurement data back to a control system (or controller) 106 on the sea vessel 100.

The sensing modules of the streamer 102 can be seismic sensing modules, such as hydrophones and/or geophones. The signal sources 105 can be seismic sources, such as air guns, vibrators, or explosives. Seismic data recorded by the seismic sensing modules on the streamer are provided back to a control system (controller) 106 on the sea vessel. The control system 106 can process the collected seismic data to develop an image of the subterranean structure 114.

In accordance with some embodiments, seismic data processing, which can be performed by the control system 106 or by a remote control system elsewhere, involves the use of combined 4D (four-dimensional) binning and regularization. The term "regularization" describes a process of mapping, interpolating, or imaging a seismic data set recorded at non-regular spatial coordinates to create a data set sampled at regular spatial coordinates. The term "4D binning" defines a process of selecting, for further processing, traces from two or more time-lapse (4D) seismic surveys in a way that maximizes or enhances the similarity of the processed surveys. A "trace" refers to the seismic energy recorded by a seismic sensor (or a channel of a seismic sensor) during data acquisition.

Conventionally, 4D binning and regularization are performed independently and sequentially (with regularization typically performed after 4D binning). However, according to some embodiments, 4D binning and regularization are performed in a combined procedure so that the effect of the 4D binning trace selection upon regularization quality can be assessed, and the 4D binning trace selection can be modified as appropriate to obtain the optimum compromise between regularization quality and time-lapse data similarity.

Typically, seismic properties, such as velocity and density, in the subsurface are heterogeneous at all scales, with magnitudes and wavelengths of the seismic velocity and density varying according to the geologic setting. The presence of heterogeneity distorts seismic data, and this distortion varies according to the locations of the seismic sources and seismic receivers. Repeated seismic surveys (such as those performed in time-lapse or 4D seismic surveying) are very likely to have non-repeated source and sensor locations; even small differences in the distortion patterns of the two data sets (for two surveys) can cause residual primary leakage on time-lapse difference data. Time-lapse (4D) seismic surveying involves acquiring multiple repeated surveys at different times to measure production-related or other development effects on a subsurface, such as effects of reservoir production.

The final processed seismic datasets for a pair of repeated surveys are frequently compared by subtracting the two to create time-lapse (4D) difference data. The 4D difference data for perfectly repeated surveys would be zero everywhere except where subsurface changes have occurred. The 4D difference data for imperfectly repeated surveys will be non-zero in areas where no subsurface changes have occurred; this energy is commonly referred to as "residual primary leakage".

Another issue associated with time-lapse seismic surveying is the effect of irregular spatial sampling. In time-lapse seismic surveying, each of the surveys performed can be irregularly sampled and also possibly differently sampled. The regular/different sampling may have the following two effects. First, the seismic processing algorithms employed on the repeated surveys may give somewhat different results due to the different sampling.

Second, the imaging of the reservoir may differ for different surveys due to the following reasons. The imaging of dipping reflectors (e.g., body of interest 116) will vary with trace midpoint and azimuth, even when the overburden is homogeneous. In principle, this can be corrected by seismic imaging algorithms, although performance of such algorithms may be compromised by irregular sampling. The imaging of the body of interest 116 will differ for different surveys also due to velocity and density heterogeneity in the overburden that will distort the seismic image. The exact pattern of distortion will vary according to the source and sensor locations of the recorded seismic data set. If the source and sensor locations of a repeated seismic survey do not accurately repeat those of the original survey, the pattern of distortion will differ. Although seismic imaging techniques such as pre-stack depth migration can compensate relatively long wavelength heterogeneity, it is not currently feasible to model and compensate shorter wavelength components.

Overburden heterogeneity can be addressed by deliberately acquiring excess data in such a way as to increase the likelihood of well repeated traces. Excess coverage provides an opportunity to select for subsequent processing (via 4D binning) the best repeated traces from a pair of time-lapse surveys.

4D binning operates on 3D common offset cubes. To define a common offset cube, an offset binning scheme is used, in which multiple contiguous offset bins are defined. Traces that fall within each offset bin are collected. When this operation is performed for an entire 3D survey, a common offset cube is produced.

A typical seismic acquisition system comprises multiple receivers at varying distances from the source. The distance between source and receiver for a given trace is referred to as the "offset", and the spatial co-ordinate of a point mid-way between the source and receiver is referred to as the "midpoint". During 3D seismic surveying, a regular spatial grid is defined; all traces whose midpoints fall within a given 3D cell of this spatial grid are defined as being co-located. The interval between the smallest and largest offset is divided into a set of so-called "common offset bins". The objective of 3D seismic surveying is that, for a given 3D cell, each common offset bin should contain at least one trace. During seismic processing, the recorded seismic dataset may be sorted into "3D common offset cubes".

For each cell of a given pair of common offset cubes (one common offset cube for each survey), the source and sensor locations from the first survey are compared with the source and sensor locations from the second survey. The pair of traces with the most similar source and sensor locations is selected for further processing, and the other traces are discarded. The process is repeated for each other cell of the common offset cubes.

Source-sensor location similarity is typically assessed by computing the sum of the absolute distance between the source locations and the absolute distance between the receiver locations. However, other attributes may be used, such as absolute distance between midpoints, trace azimuth difference, or data-based attributes such as NRMS (normalized root mean square) difference. A midpoint for a seismic data trace is a point that is midway between the seismic source location and the seismic receiver location of the trace. Use of NRMS difference is described in E. Kragh et al., "Seismic Repeatability, Normalized RMS, and Predictability," the Leading Edge, pp. 640-647 (July 2002).

To compensate for irregular data sampling in each seismic survey, a regularization technique can be applied. There are two main classes of regularization techniques. A first class of regularization technique preserves the original data geometry. In this case, a subsequent process, such as Kirchhoff imaging, maps the data from the irregular to regular locations. In the Kirchhoff imaging example, the regularization technique attempts to precondition the data to overcome the limitations of Kirchhoff imaging in the presence of irregular sampling. Examples include area weighting and Voronoi weighting. Area weighting is described in A. Canning et al., "Reducing 3-D Acquisition Footprint for 3-D DMO and 3-D Prestack Migration," Geophysics, Vol. 63, No. 4, pp. 1117-1183 (1998). Voronoi weighting is described in H. Jaramillo, "Practical Aspects of Voronoi-Based Area Weights for Kirchhoff Migration," 75th Annual International Meeting: Society of Expl. Geophysics, pp. 1886-1889 (2005). This first class of regularization technique is referred to as a weighted regularization technique.

A second class of regularization technique repositions the data onto a regular layout. Examples of this second class of regularization technique include an interpolation technique and an integral technique. An interpolation technique is described in P. Zwartjes et al., "Fourier Reconstruction of Marine-Streamer Data in Four Spatial Co-Ordinates," Geophysics, Vol. 71, No. 6, pp. V171-V186 (2006). An example integral technique is described in H. Jaramillo et al., "Seismic Data Mapping," 68th Annual International Meeting: Society of Expl. Geophysics, (1998).

Most regularization techniques are based solely on trace coordinates, although integral techniques may employ simple velocity field assumptions.

To address shortcomings associated with conventional 4D binning and regularization techniques that are conventionally performed independently, a procedure performed by some embodiments combines regularization and 4D binning such that regularization and 4D binning are performed together. In some embodiments, 4D binning is performed within a regularization algorithm, provided that the regularization algorithm can generate a measure of likely regularization quality. Example regularization quality measures include, for an interpolation process, an estimate of how well a given spectral component can be reconstructed, given the input data sampling. Another example regularization quality measure, for a weighting process, is the size of the weight for a given trace, which is an indication of its importance to the regularization process.

Figure 2:
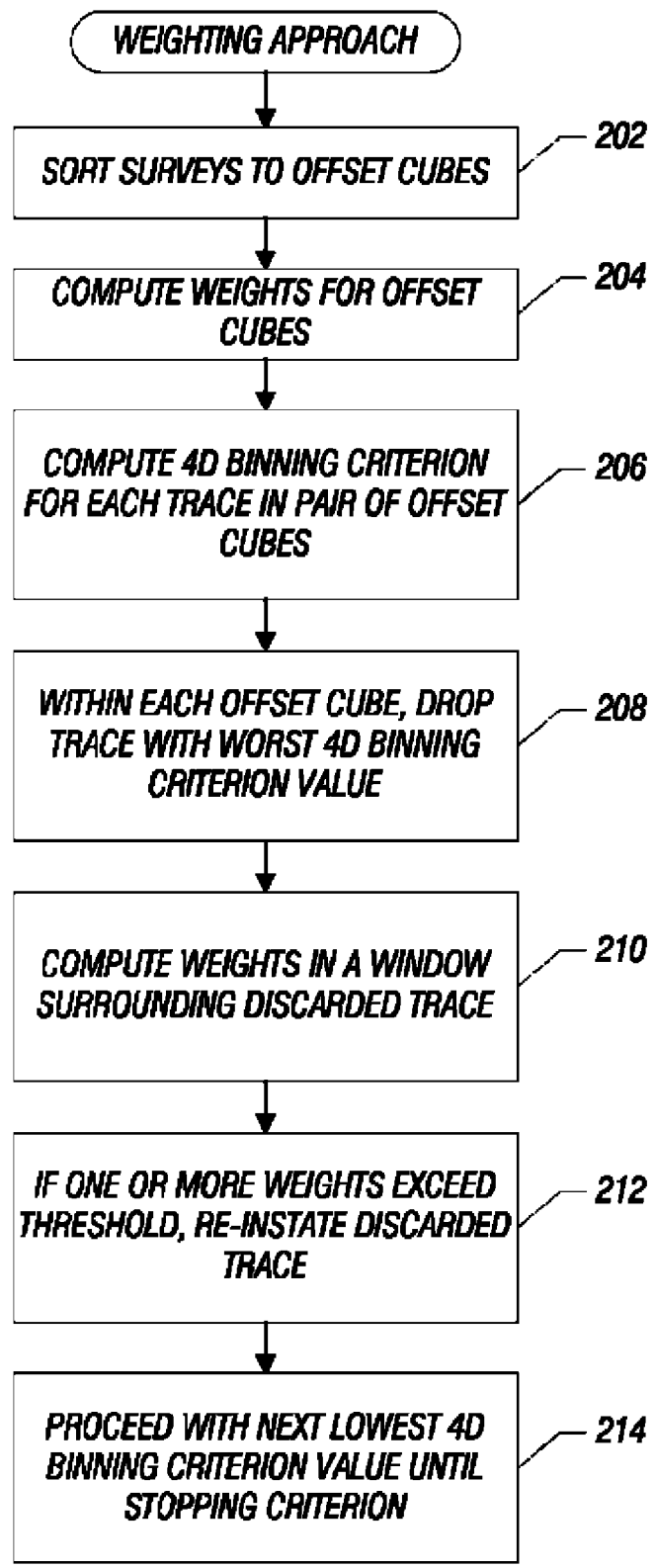
FIGS. 2 and 3 are flow diagrams of procedures of processing seismic data in which four-dimensional (4D) binning is performed together with regularization, in accordance with some embodiments.

The combined regularization and 4D binning procedure operates somewhat differently depending on whether an interpolation or weighting approach is used for regularization. If the weighting approach is used, as depicted in FIG. 2, then the traces are weighted depending on how important they are to the regularization process. Traces with midpoints close to each other are less important, but isolated traces are more important; therefore, isolated traces are assigned higher weights than traces that are close to each other. The weights indicate importance to imaging. Generally, a weight assigned to a trace is dependent upon nearby trace(s)

The two surveys are sorted (at 202) to offset cubes, and the weights are computed (at 204) for traces of each pair of cubes. A 4D binning criterion (or measure) is computed (at 206) for each trace in the pair of offset cubes. The 4D binning criterion is based on comparing source and sensor locations of a first survey (first offset cube) with source and sensor locations of a second survey (second offset cube). The pair of traces with the most similar source and sensor locations is considered more important for 4D binning (and thus will be associated with better 4D binning criterion values), whereas pairs of traces with dissimilar source and sensor locations will have worse (less desirable) 4D binning criterion values. A 4D binning criterion that can be considered is the sum of distances (SD sum) of sources and sensors in the pair of offset cubes. Other 4D binning criteria can also be used, such as absolute difference between midpoints, trace azimuth difference, or data-based attributes such as NRMS difference.

The trace with the worst SD sum is discarded, and the effect of this on the image is determined. Within each offset cube, the trace with the worst 4D binning criterion value is dropped (at 208), and the weights of traces in a window (having predefined size) surrounding the location of the discarded trace are computed (at 210) after discarding the trace. As noted above, weights assigned to traces as part of the regularization procedure are generally based on nearby traces, so that discarding a trace as performed at 208 will cause the weights of traces in the window to change.

If one or more of the weights of the traces in the window exceed a predefined weight threshold, the previously discarded trace is re-instated (at 212). What this means is that the previously discarded trace (based on a 4D binning measure) is important for regularization, so that the previously discarded trace should not have been discarded. The algorithm then proceeds to the trace with the next worst 4D binning criterion value, and repeats (at 214) the process until all traces are processed or some lower limit to the 4D binning criterion is reached or some other stopping criterion is reached.

A more detailed description of a possible implementation of the weighting approach is provided in the procedure provided below.

Define the desired maximum value of the 4D binning criterion (4DC1)

Define the maximum acceptable value of the 4D binning criterion (4DC2)

Define 'n' 4D binning criterion test values between 4DC1 and 4DC2 ($4DCT_1 \ldots 4DCT_n$)

Define the maximum acceptable regularization weight threshold (RWMAX)

Define an offset binning scheme that allows each survey to be sorted to a series of common offset 3D cubes.

For each offset bin
    For each trace of survey 1, find the trace on survey 2 that gives the optimum 4D binning criterion value. Optionally allow searching in adjacent offset bins. Store the 4D criterion value and the trace identifier of the survey 2 trace.
    For each trace of survey 2, find the trace on survey 1 that gives the optimum 4D binning criterion value. Optionally allow searching in adjacent offset bins. Store the 4D criterion value and the trace identifier of the survey 1 trace.
    Select all traces from survey 1 with 4D criterion values less than $4DCT_1$.
    Select all traces from survey 2 with 4D criterion values less than $4DCT_1$.
    Compute regularization weights for surveys 1 and 2.

Figure 3:
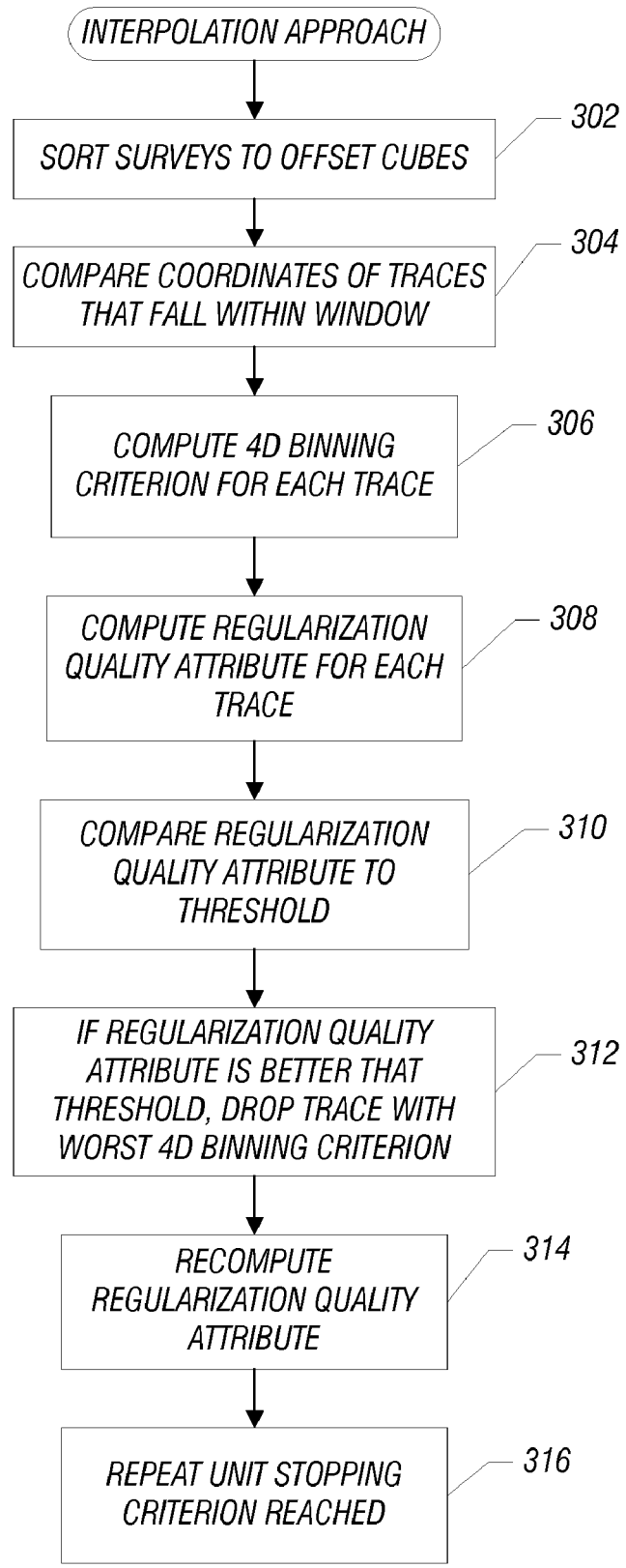

For i=2 to n
    For each survey 1 trace with regularisation weight greater than RWMAX
        Identify nearby survey 1 traces with 4D binning criterion less than $4DCT_i$
        Select these traces from survey 1, and use the stored trace identifiers to select the necessary traces from survey 2, if not already selected
    Recompute regularization weights on survey 2
    For each survey 2 trace with regularization weight greater than RWMAX
        Identify nearby survey 2 traces with 4D binning criterion less than $4DCT_i$ Select these traces from survey 2, and use the stored trace identifiers to select the necessary traces from survey 1, if not already selected Recompute regularization weights on both surveys FIG. 3 shows the flow of an interpolation approach of the combined 4D binning and regularization procedure. If the interpolation approach is used, the trace for a given output location is the weighted sum of the input traces within a window centered at this output location. With interpolated regularization, note that interpolated traces are generated at the center of each defined window from seismic data with irregular midpoint locations to produce seismic data that is regularly sampled. The "output location" referred to above is the center of each such window.

The surveys are also sorted (at 302) to offset cubes. The coordinates of the traces from each survey that fall within the window are compared (at 304), and the 4D binning criterion is computed (at 306) for each trace in a given pair of offset cubes. Also, a regularization quality attribute is computed (at 308) for each trace of each survey and compared (at 310) with a threshold value. The regularization quality attribute refers to a quality measure of interpolation. An example interpolation quality attribute could be generated by computing trial waveforms sampled at the input locations, and to interpolate these to produce interpolated waveforms. Comparison of the interpolated and known waveforms would allow the interpolation quality to be estimated. The interpolated waveform is compared to what the output should look like (expected waveforms) to provide the regularization quality attribute. If the regularization quality attribute is better than the threshold, then the trace with the worst 4D binning criterion value is dropped (at 312). After dropping such trace, the regularization quality attribute is recomputed (at 314). The process repeats (at 316) until a stopping criterion is reached.

Basically, the SD sum (example 4D binning criterion) is traded off against the interpolation quality measure. For a given output location, the procedure looks in the window, and computes the SD sum for traces. The traces with the worst SD sums are discarded, and the interpolation is repeated. The regularized outputs are then computed, and the algorithm moves on to the next output location.

A more detailed description of a possible implementation of the interpolation approach is set forth in the procedure below.

Define the desired maximum value of the 4D binning criterion (4DC1)

Define the maximum acceptable value of the 4D binning criterion (4DC2)

Define the maximum acceptable interpolation quality threshold (ACMAX)

Define an offset binning scheme that allows each survey to be sorted to a series of common offset 3D cubes.

Define the output spatial locations for the interpolated data (normally based upon the 3D grid)

Define the inline and crossline size of the window used to select the traces to be used when creating the interpolated trace at a given output location. This window is centered at the current output location. If a 3D (inline, crossline, offset) interpolation is being used, define the window size in the offset direction. This window is centered at the current offset bin center.

For each offset bin

For each output location

Select all survey 1 traces that fall within the spatial and, optionally, offset window centered upon this output location Select all survey 2 traces that fall within the spatial and, optionally, offset window centered upon this output location For each trace of survey 1, find the trace on survey 2 that gives the optimum 4D binning criterion value. Store the 4D criterion value and the trace identifier of the survey 2 trace.

For each trace of survey 2, find the trace on survey 1 that gives the optimum 4D binning criterion value. Store the 4D criterion value and the trace identifier of the survey 1 trace.

Select all survey 1 and survey 2 traces with 4D binning criterion less than 4DC1

Compute interpolation quality attribute for survey 1 and survey 2

For survey 1

While interpolation quality attribute is greater than ACMAX

For previously discarded traces with 4D binning criterion between 4DC1 and 4DC2

Reinstate the trace with the smallest 4D binning criterion value and use the stored trace identifiers to select the necessary trace from survey 2, if not already selected Recompute the interpolation quality attribute For survey 2

While interpolation quality attribute is greater than ACMAX

For previously discarded traces with 4D binning criterion between 4DC1 and 4DC2

Reinstate the trace with the smallest 4D binning criterion value and use the stored trace identifiers to select the necessary trace from survey 1, if not already selected Recompute the interpolation quality attribute Create survey 1 and 2 interpolated traces for this output location.

Alternative approaches can be used in other embodiments of combined regularization and 4D binning. For example, a relationship between the regularization quality attribute and a seismic repeatability metric (such as NRMS difference amplitude, for example) can be defined. Also, a relationship between the 4D binning criteria for the traces that contribute to the output location and the same seismic repeatability attribute can be defined.

As traces are discarded, the seismic repeatability metric associated with the regularization quality should get worse and the seismic repeatability metric associated with the 4D binning criterion should get better. The point at which they intersect is the optimum compromise between 4D binning and regularization quality.

Generally, the combined 4D binning and regularization procedure for processing seismic data considers both the 4D binning measures as well as regularization quality measures (which can be in the form of weighting or interpolation-based quality measures) together to achieve a compromise between 4D binning quality and regularization quality.

Figure 4:
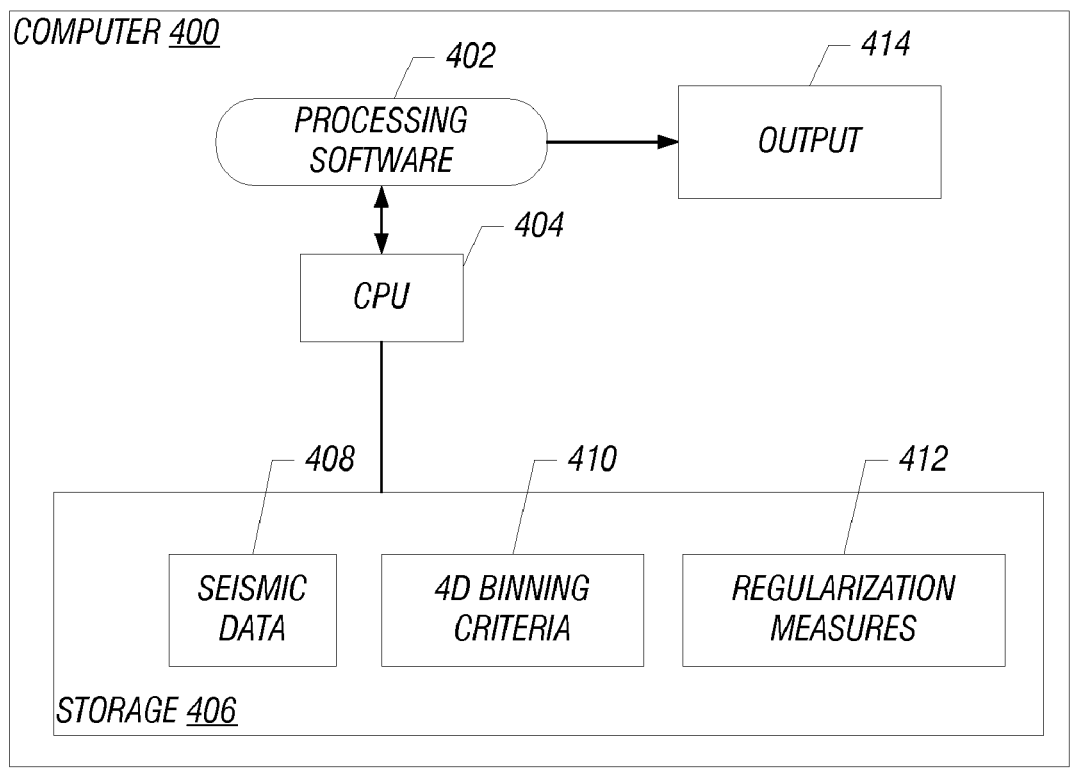
FIG. 4 is a block diagram of an example computer in which software for performing a procedure according to an embodiment is executable.

The tasks of FIGS. 2 and 3 corresponding to the combined 4D binning and regularization procedure can be performed by processing software, such as processing software 402 in a computer 400 depicted in FIG. 4. The processing software 402 is executable on one or more central processing units (CPUs 404). The one or more CPUs 404 are connected to a storage 406 that contains seismic data 408 (acquired in the field), 4D binning criteria 410 (calculated by the processing software 402), and regularization measures 412 (calculated by the processing software 402). The processed seismic data can be output (at 414), such as in the form of graphs, reports, and so forth, that are displayable in a display device, for example, or that can be communicated over a network to a remote terminal.

Instructions of the processing software 402 are loaded for execution on a processor (such as the one or more CPUs 404). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of processing seismic data, comprising:
performing, by a system having a processor, a combined four-dimensional (4D) binning and regularization procedure on the seismic data, wherein the combined 4D binning and regularization procedure comprises:
computing measures associated with regularization of the seismic data;
computing measures associated with 4D binning, wherein the 4D binning includes selecting traces from the seismic data of time-lapse seismic surveys;
discarding at least one trace of the seismic data that is based on considering both the regularization measures and the 4D binning measures; and
processing the seismic data according to the regularization measures and 4D binning measures.

2. The method of claim 1, further comprising performing the regularization in the procedure to compensate for irregular spatial sampling during seismic surveys.

3. The method of claim 1, wherein computing the regularization measures comprises assigning weights to traces of the seismic data.

4. The method of claim 3, wherein assigning the weights to the traces of the seismic data comprises assigning weights to each trace based on nearby one or more traces.

5. The method of claim 4, wherein traces that are closer together are less important than traces that are farther apart, wherein assigning the weights is based on proximity of the traces.

6. The method of claim 1, wherein computing the regularization measures comprises computing interpolation-based regularization measures.

7. The method of claim 6, wherein computing the interpolation-based regularization measures comprises:
producing trial waveforms;
interpolating the trial waveforms to provide interpolated waveforms;
comparing the interpolated waveforms to expected waveforms,
wherein the interpolation-based regularization measures are based on the comparing.

8. The method of claim 1, further comprising:
re-computing regularization measures of traces of the seismic data near the discarded trace; and
in response to the re-computed regularization measures, determining whether or not to re-instate the discarded trace.

9. The method of claim 8, wherein determining whether or not to re-instate the discarded trace is based on comparing the re-computed regularization measures to a predefined threshold.

10. The method of claim 8, wherein re-computing the regularization measures of traces near the discarded trace comprises re-computing the regularization measures of traces within a window that contains a location of the discarded trace.

11. The method of claim 1, wherein the combined 4D binning and regularization procedure includes iteratively using trace selection of the 4D binning to influence the regularization.

12. The method of claim 11, wherein iteratively using the trace selection of the 4D binning to influence the regularization comprises re-computing the regularization measures after the trace selection of the 4D binning, and performing further trace selection of the 4D binning after the re-computing.

13. An article comprising at least one computer-readable storage medium containing instructions that when executed cause a computer to:
perform a combined four-dimensional (4D) binning and regularization procedure on seismic data, wherein the combined 4D binning and regularization procedure comprises:
computing measures associated with regularization of the seismic data; computing measures associated with 4D binning, wherein the 4D binning includes selecting traces from the seismic data of time-lapse seismic surveys;
discarding at least one trace of the seismic data that is based on considering both the regularization measures and the 4D binning measures; and
processing the seismic data according to the regularization measures and 4D binning measures.

14. The article of claim 13, wherein computing the measures associated with the 4D binning comprises computing a sum of distances of sources and sensors in a pair of offset cubes corresponding to different seismic surveys.

15. The article of claim 13, wherein discarding the at least one trace comprises discarding a particular trace associated with a worst 4D binning measure, and wherein the processing further comprises:
re-computing regularization measures after discarding the particular trace; and
determining whether or not to re-instate the discarded particular trace based on the re-computed regularization measures.

16. The article of claim 13, wherein the combined 4D binning and regularization procedure includes iteratively using trace selection of the 4D binning to influence the regularization.

17. The article of claim 16, wherein iteratively using the trace selection of the 4D binning to influence the regularization comprises re-computing the regularization measures after the trace selection of the 4D binning, and performing further trace selection of the 4D binning after the re-computing.

18. A computer comprising:

a storage to store seismic data; and a processor to:

compute measures associated with regularization of the seismic data;

compute measures associated with performing four-dimensional (4D) binning, wherein the 4D binning includes selecting traces from the seismic data of time-lapse seismic surveys;

discard at least one trace of the seismic data that is based on considering both the regularization measures and the 4D binning measures; and process the seismic data according to the regularization measures and the 4D binning measures.

19. The computer of claim 18, wherein the processor is to further perform a combined 4D binning and regularization procedure that includes the computation of the regularization measures and the 4D binning measures, and the processing of the seismic data, and wherein the combined 4D binning and regularization procedure includes iteratively using trace selection of the 4D binning to influence the regularization.

* * * * *